US009126641B1

(12) United States Patent
Sato

(10) Patent No.: US 9,126,641 B1
(45) Date of Patent: Sep. 8, 2015

(54) SPOILER

(71) Applicant: Inoac Corporation, Nagoya, Aichi (JP)

(72) Inventor: Kensuke Sato, Anjo (JP)

(73) Assignee: INOAC CORPORATION, Aichi (JP)

(*) Notice: Subject to any disclaimer, the term of this patent is extended or adjusted under 35 U.S.C. 154(b) by 0 days.

(21) Appl. No.: 14/572,399

(22) Filed: Dec. 16, 2014

(30) Foreign Application Priority Data

Jul. 9, 2014 (JP) .................................. 2014-141577

(51) Int. Cl.
*B62D 35/00* (2006.01)
(52) U.S. Cl.
CPC .................................... *B62D 35/007* (2013.01)
(58) Field of Classification Search
CPC ........................................................ B62D 35/007
USPC ......................................................... 296/187.1
See application file for complete search history.

(56) References Cited

U.S. PATENT DOCUMENTS

| 5,403,059 | A  | * | 4/1995 | Turner | .............................. 296/91 |
| 8,251,435 | B2 | * | 8/2012 | Ezaka | .......................... 296/180.1 |
| 2014/0117710 | A1 | * | 5/2014 | Kurata | ........................ 296/180.1 |

FOREIGN PATENT DOCUMENTS

JP         P2014-12471 A      1/2014

* cited by examiner

*Primary Examiner* — Pinel Romain
(74) *Attorney, Agent, or Firm* — DLA Piper LLP (US)

(57) ABSTRACT

A spoiler including an upper member forming a design surface and a lower member. Upper coupling parts each having an upper through hole passing therethrough in a direction crossing an overlapping direction in which the upper member and the lower member are overlapped are formed to protrude on the back side of the upper member. Lower coupling parts facing the upper coupling parts with a space therebetween are formed on the lower member. Lower through holes overlapping the respective upper through holes are formed through the respective lower coupling parts. The spoiler further includes clips each attached to the upper and lower coupling parts with the space therebetween as one of a plurality of wing parts formed on each clip is hooked at the edge of an opening of at least one of the upper and lower through holes from an opposite side to the head portion of the clip.

16 Claims, 6 Drawing Sheets

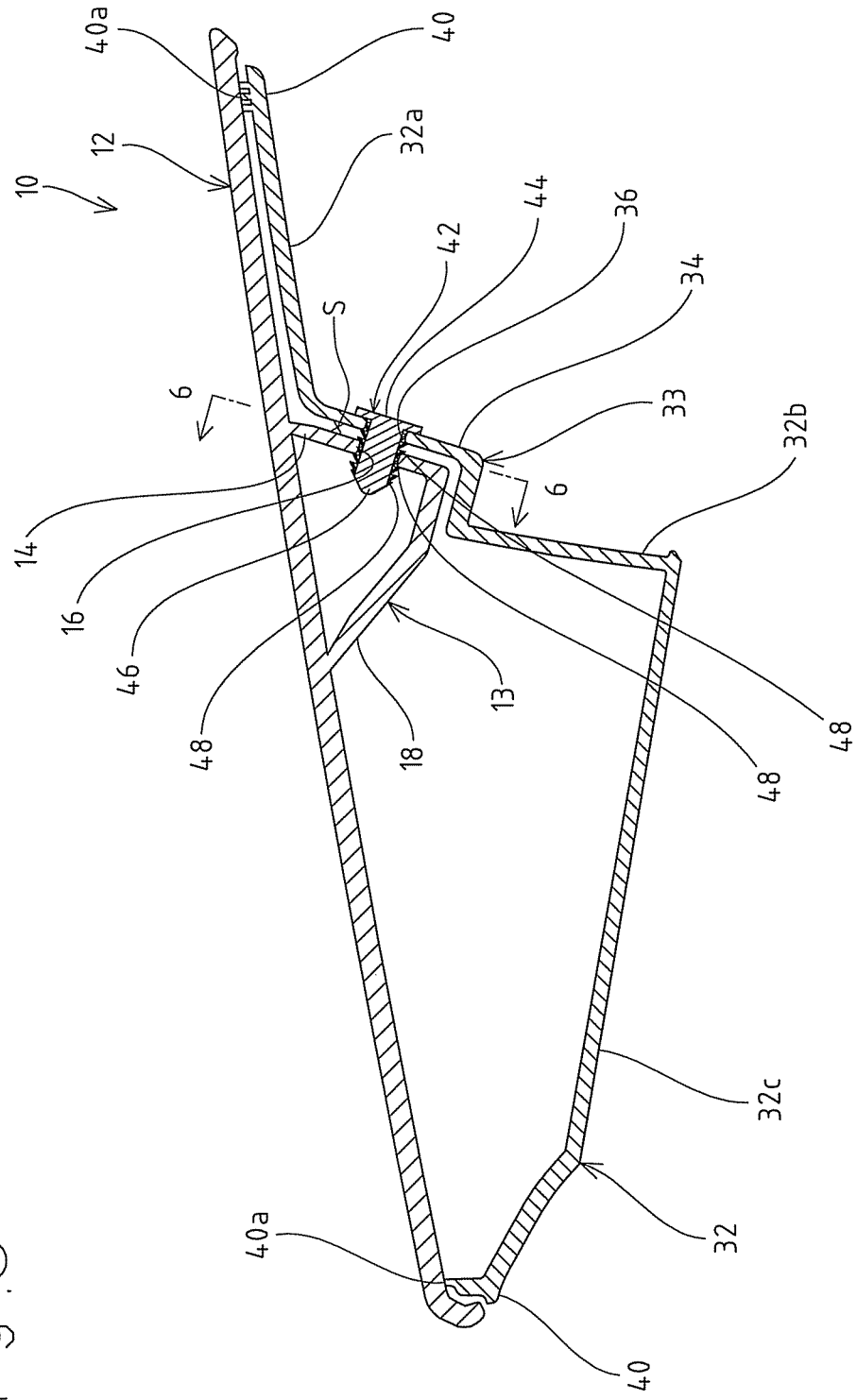

SPOILER

BACKGROUND OF THE INVENTION

1. Field of the Invention

The present invention relates to a spoiler to be attached to the body of a vehicle.

2. Description of the Related Art

A spoiler is generally attached to the roof end or trunk lid of a vehicle to regulate airflow while driving or to dress up the body of a vehicle. Spoilers are mostly molded articles of a synthetic resin, and it mainly includes an upper member, which serves as a design part, and a lower member, which is welded to the back side of the upper member by, for instance, vibration welding. Further, in most of the spoilers, screws and nuts are auxiliarily used to couple the upper and lower members together (for example, see Japanese Unexamined Patent Publication No. 2014-12471).

The spoiler disclosed in Japanese Unexamined Patent Publication No. 2014-12471 has nuts that are fitted in through holes of upper coupling parts formed to protrude on the back side of the upper member. After the upper member and the lower member are joined together with lower coupling parts formed on the lower member abutting on the upper coupling parts, the screws are fastened into the nuts via the through holes formed in the lower coupling parts.

When the screws and the nuts are connected in the spoiler described above, the upper coupling parts and the lower coupling parts are fastened so as to be closer to each other. For this reason, the upper coupling parts may be strongly pulled to deform the design surface of the upper member, so that the outward appearance of the spoiler becomes unattractive. In addition, while the upper coupling parts and the lower coupling parts are set to abut on each other, the upper coupling parts and the lower coupling parts may interfere with each other or a space may be formed therebetween when there are size variations in the upper and lower members or there are variations in assembling at the time the upper and lower members are joined. When the upper coupling parts deform due to the interference with the lower coupling parts, it also causes deformation of the upper member. Then, if the upper coupling parts are spaced apart from the lower coupling parts, the deformation of the upper coupling parts becomes larger as the screws and nuts are tightened together, causing the deformation of the design surface of the upper member to be more prominent.

SUMMARY OF THE INVENTION

In light of the inherent problems of the related art described above, therefore, the present invention solves the problems, and an object of the invention is to provide a good-looking spoiler.

To overcome the problems and achieve the desired object, a spoiler according to a first aspect of the invention includes:
- a first (or upper) member forming a design surface;
- a second (or lower) member joined to the first member by welding or bonding a joint part thereof placed over the back side of the first member;
- a first coupling part formed to protrude on the back side of the first member and having a first through hole passing through in a direction crossing the overlapping direction in which the back side of the first member and the joint part of the second member are overlapped each other;
- a second coupling part formed on the second member so as to face the first coupling part with a space therebetween when the back side of the first member is joined to the joint part of the second member, the second coupling part having a second through hole overlapping the first through hole; and
- a clip to be inserted into the first through hole and the second through hole so as to be attached to the first coupling part and the second coupling part, the clip having
  - a shaft part to be inserted into the first through hole and the second through hole,
  - a head portion provided at one end of the shaft part and unable to pass through the first and second through holes, and
  - a plurality of wing parts formed on the shaft part so that they are to be aligned in an axial direction thereof and extend outward in a direction crossing the axial direction, one of the plurality of wing parts of the clip being hooked at an edge of the opening of at least one of the first and second through holes from the opposite side to the head portion so that the clip is attached to the first coupling part and the second coupling part with the space therebetween.

According to a first aspect of the present invention, the first coupling part and the second coupling part are faced each other with the second through hole aligned with the first through hole that is passing through in the direction crossing the overlapping direction in which the back side of the first member and the joint part of the second member are overlapped each other. The clip is attached with its shaft part inserted into the first and second through holes so as to prevent the movement of the first member and the second member in the overlapping direction. The clip is attached to the first coupling part and the second coupling part so that the axial directional movement of the shaft part is prevented by the head portion which is unable to pass through the first and second through holes and by the wing parts which are hooked at the edges of the openings of the through holes from the opposite side to the head portion. In addition, because the clip is attached to the first coupling part and the second coupling part by the head portion and by the wing parts which can be hooked at the edges of the openings of the through holes, the coupling parts of the first and second members are not tightened each other. This suppresses the deformation of the design surface of the first member which is caused by the pulling of the first coupling part, so that the appearance of the spoiler can be enhanced. Further, the space between the first coupling part and the second coupling part prevents the interference between the first coupling part and the second coupling part which is caused by a variation or the like of the sizes of the first and second members. Accordingly, it is possible to prevent the interference-originated deformation of the first member, enhancing the appearance of the spoiler.

According to a second aspect of the present invention, the first coupling part and the second coupling part are set so that a space is provided therebetween when the first member and the second member are assembled.

The second aspect of the invention prevents the interference between the first coupling part and the second coupling part which occurs at the time of assembling or joining the first member and the second member together.

According to a third aspect of the invention, the head portion of the clip abuts on one of the first and second coupling parts, and one of the plurality of wing parts of the clip is hooked at an edge of the opening of the through hole of another one of the first and second coupling parts from the opposite side to the head portion.

According to the third aspect of the invention, the head portion of the clip abuts on one of the first and second coupling parts, and one of the wing parts of the clip is hooked on another one of the first and second coupling part, thereby preventing the axial directional movement of the clip, so that the clip is attached stably.

According to a fourth aspect of the invention, one of the plurality of wing parts of the clip is fitted in the through hole of at least one of the first and second coupling parts.

According to the fourth aspect of the invention, the movement of the clip in the direction crossing the axial direction of the shaft part is prevented, thereby permitting the clip to be attached stably.

According to a fifth aspect of the invention, the first member and the joint part of the second member are joined by vibration welding which causes linear vibration along the back side of the first member, and the first coupling part and the second coupling part of the first and second members are formed so as to extend in the vibration direction at the time of the vibration welding.

According to the fifth aspect of the invention, the first member and the joint part of the second member can be joined by vibration welding without causing interference between the first coupling part and the second coupling part.

The spoiler according to the present invention has an enhanced good-looking appearance.

BRIEF DESCRIPTION OF THE DRAWINGS

FIG. 3 is an enlarged cross-sectional view taken along the line 3-3 in FIG. 1.

DETAILED DESCRIPTION OF THE PREFERRED EMBODIMENT

A spoiler according to the present invention is described below by way of a preferred embodiment with reference to the accompanying drawings. In the description of the embodiment, a rear spoiler is given as an example which is mounted to the top portion of the back door (rear window) ranging to the roof portion of a vehicle, and it is positioned rear of the roof portion to extend backward of the back door. In the description below, the directions of the spoiler are explained in relation to the directions of the vehicle. Also in the spoiler of the embodiment below, the direction in which the back side of the first member and the joint part of the second member are overlapped each other is the up-down direction. Further, in the embodiment below the long lengthwise direction of the spoiler is its right-left direction, and the short lengthwise direction of the spoiler is its front-rear direction.

A spoiler 10 according to one embodiment of the present invention is formed horizontally elongated so as to be substantially the same size as the right-left width of the upper portion of the back door of a vehicle (right-left width of the rear edge of the roof portion), and it has a front-rear directional size that is set shorter than the length of the right-left width.

Figure 1:
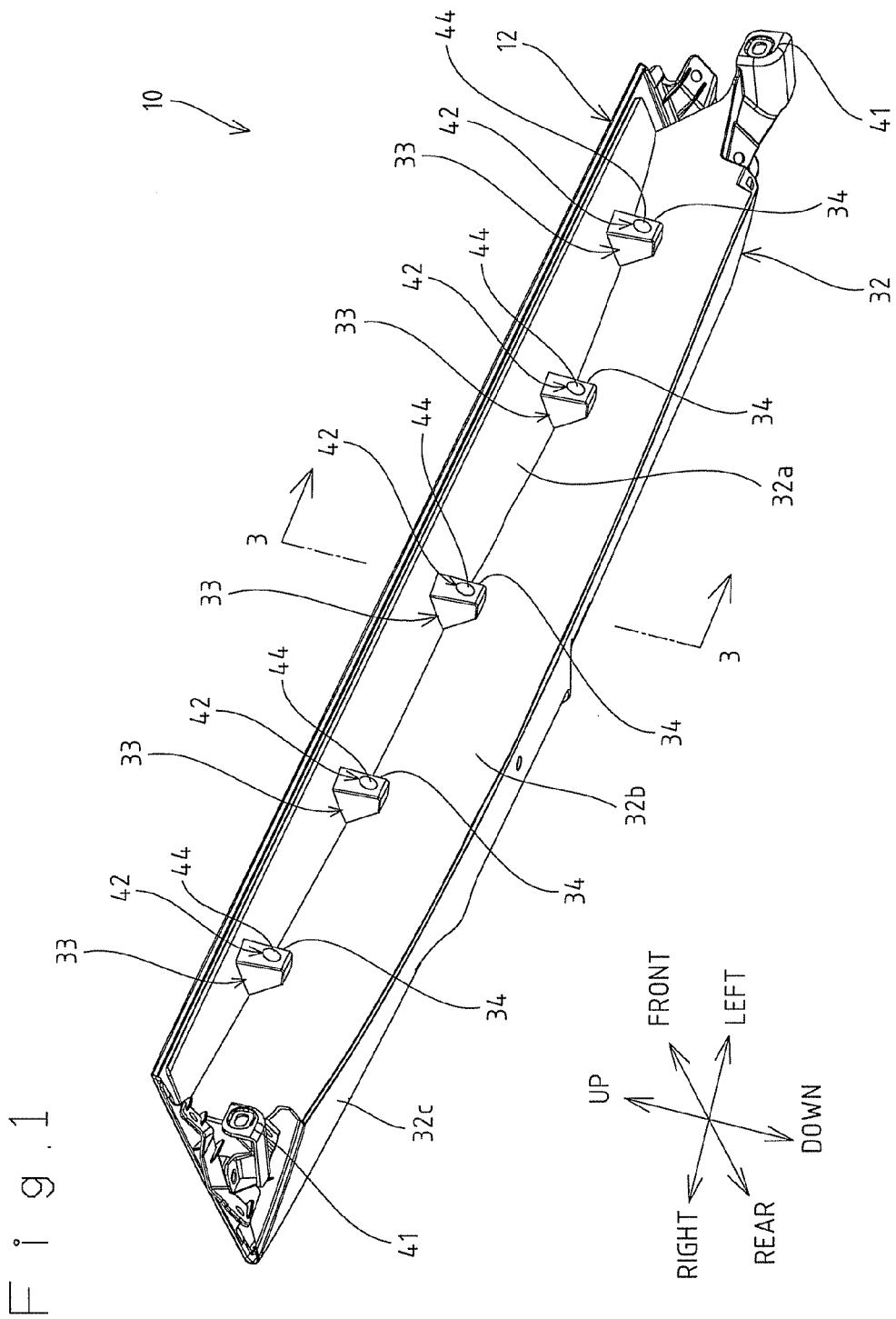
FIG. 1 is a perspective view of a spoiler according to one embodiment of the invention as viewed from the bottom side.
Figure 2:
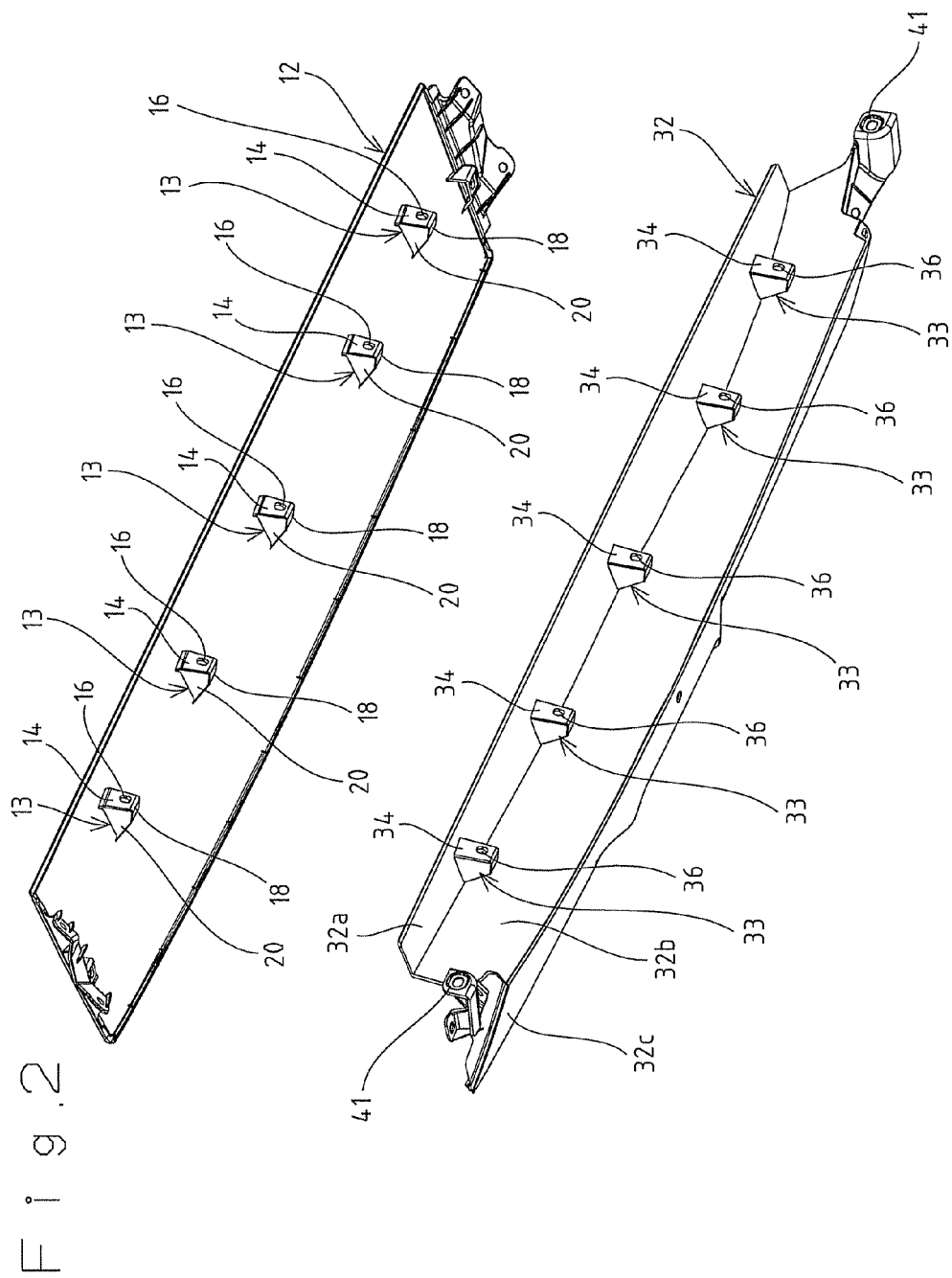
FIG. 2 is an exploded perspective view of the spoiler of the embodiment.

As illustrated in FIGS. 1 to 3, the spoiler 10 comprises an upper member (first member) 12, whose top surface forms a design surface of the spoiler 10, and a lower member (second member) 32, which is assembled into the back side of the upper member 12. The upper member 12 and the lower member 32 are joined together by vibration welding, and the upper member 12 and the lower member 32 are further joined by coupling with clips 42 in addition to the vibration welding. The spoiler 10 is mounted to the body of a vehicle by fitting the fixtures (not shown) mounted to the mount seats 41 of the lower member 32 to the vehicle body.

The upper member 12 and the lower member 32 are molded articles of a thermoplastic resin. As illustrated in FIGS. 1 to 3, the upper member 12 of the shown embodiment is formed in a flat plate elongated in the right-left direction, mainly constituting the upper portion of the spoiler 10 that extends substantially horizontally in the front-rear and right-left directions. The lower member 32 is formed in a flat plate elongated in the right-left direction so as to comply with the upper member 12.

The lower member 32 is, as best seen from FIG. 3, in a step-like shape including a horizontal surface portion 32a extending substantially horizontally along the front portion of the upper member 12, a connection surface portion 32b extending downward from the rear edge of the horizontal surface portion 32a, and an inclined surface portion 32c inclined upwardly from the lower edge of the connection surface portion 32b to the rear end. The front edge of the horizontal surface portion 32a is provided with a front joint part 40 having a plurality of welding projections 40a projecting upward from the top surface of the lower member 32 that faces the back side (bottom surface) of the upper member 12. The rear edge of the inclined surface portion 32c is provided with a rear joint part 40 having a plurality of welding projections 40a projecting upward from the top surface of the lower member 32 that faces the back side (bottom surface) of the upper member 12. The welding projections 40a in the embodiment are formed like ribs extending in the right-left direction.

In this spoiler 10, the upper member 12 and the joint parts 40 of the lower member 32 are joined by vibration welding with the front and rear joint parts 40 of the lower member 32 placed over the back side of the upper member 12. In the vibration welding, the upper member 12 and the lower member 32 are set to make relative linear reciprocal motions in the right-left direction along the back side of the upper member 12. In the shown embodiment, the lower member 32 is vibrated in the right-left direction relative to the upper member 12 so that the upper member 12 and the lower member 32 are welded together. In other words, the right-left direction is the vibration direction at the time of vibration welding in the embodiment. As seen from the above, the upper member 12 and the lower member 32 are joined together at the front edge portion and the rear edge portion by welding the back side of the upper member 12 and the joint parts 40 of the lower member 32 which are overlapped in the up-down direction. In the spoiler 10 thus formed, the inclined surface portion 32c of the lower member 32 forms a design surface of the lower portion of the spoiler 10, and the horizontal surface portion 32a and the connection surface portion 32b of the lower member 32 form a mount surface that faces the vehicle body.

As illustrated in FIGS. 2 and 3, a plurality of upper coupling parts (first coupling parts) 14 to which the clips 42 are attached are provided, apart from one another in the right-left direction, on the back side of the upper member 12. The upper coupling parts 14 are provided apart in the front-rear direction from the portion where it overlaps the joint parts 40 of the lower member 32. The upper coupling parts 14 of the upper member 12 are formed to project from the back side of the upper member 12, and each upper coupling part 14 is formed in such a way that its plate surface is parallel to the vibration direction. The upper coupling part 14 is a plate-like portion formed to downwardly project from the back side of the upper member 12, with its plate surface extending in the up-down and right-left directions. A circular upper through hole (first through hole) 16 passing through in the front-rear direction crossing the overlapping direction of the back side of the upper member 12 and the joint parts 40 of the lower member 32 (hereinafter referred to as "overlapping direction") is formed in each one of the upper coupling parts 14. The upper coupling part 14 is supported by a first reinforcing part 18 extending obliquely rearward and upward from the lower end of the upper coupling part 14 so as to be contiguous to the back side of the upper member 12 and by a second reinforcing part 20 contiguous to the back side of the upper member 12 from the first reinforcing part 18 and the right-side edge of the upper coupling part 14. With the above elements that include the upper coupling part 14, the first reinforcing part 18 and the second reinforcing part 20, an upper mount seat 13 is formed like a box facing to one lateral side or to the left side.

FIGS. 2 and 3 further shows a plurality of lower coupling parts (second coupling parts) 34 to which the clips 42 are attached, and these coupling parts 34 are provided on the lower member 32 apart from one another in the right-left direction. The lower coupling parts 34 are provided on the lower member 32 so as correspond to the respective upper coupling parts 14 of the upper member 12. The lower coupling parts 34 are provided on the front sides of the respective upper coupling parts 14 and facing the upper coupling parts 14 with a space S therebetween when the upper member 12 and the lower member 32 are assembled together. The lower coupling parts 34 are provided spaced apart in the front-rear direction from those portions that overlap the joint parts 40 of the lower member 32. Each one of the lower coupling parts 34 is formed to bend from the horizontal surface portion 32a, and its plate surface becomes parallel to the vibration direction. The lower coupling part 34 of the embodiment is a plate-like portion formed to extend downward from the horizontal surface portion 32a and extend along the connection surface portion 32b, with its plate surface extending in the up-down and right-left directions. Further, the front surface of the upper coupling part 14 and the rear surface of the lower coupling part 34 are set to provide the space S therebetween in the front-rear direction when the upper member 12 and the lower member 32 are joined together. In other words, the lower coupling part 34 is spaced apart from the upper coupling part 14 in the front-rear direction and extends along and in parallel to the upper coupling part 14. In the embodiment, the horizontal surface portion 32a and the connection surface portion 32b are recessed to serve as a front wall portion of a recessed lower mount seat 33 that opens upward and rearward, thereby forming the lower coupling part 34. A circular lower through hole (second through hole) 36 passing through in the front-rear direction crossing the overlapping direction is formed in the lower coupling part 34. The lower through hole 36 is arranged to overlap (or positionally coincide with) the upper through hole 16 of the upper member 12 in the front-rear direction with their centers aligned with each other. The lower through hole 36 and the upper through hole 16 have the same size and the same shape.

As illustrated in FIGS. 1 and 3, the spoiler 10 is configured such that the upper member 12 and the lower member 32 are coupled together by the clips 42 mounted in the lower and upper through holes 36 and 16 to prevent the movement in which the back side of the upper member 12 and the joint parts 40 of the lower member 32 are separated from each other in the up-down direction. Each clip 42 is a fixture called such as "brush clip", which is attached to fit into the through holes 16, 36 and differs from a screw, bolt or the like to be mounted by screwing into a screw hole.

Figure 5:
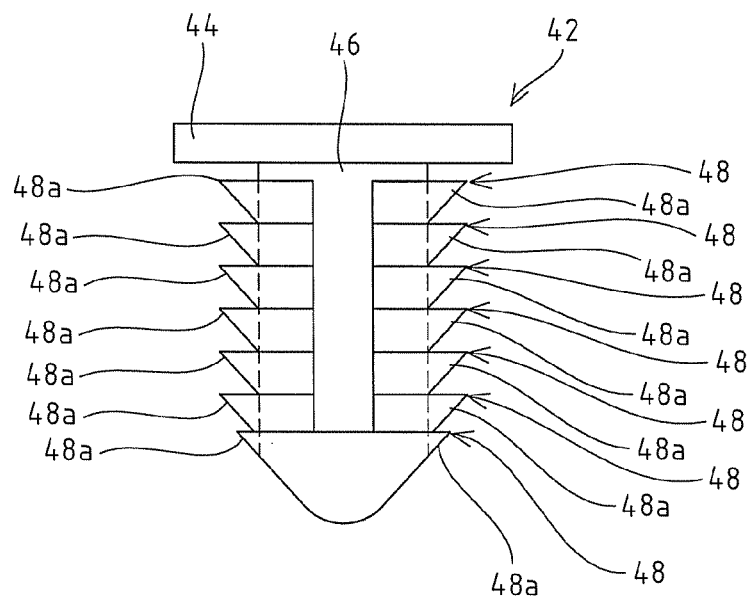
FIG. 5 is a front view of the clip according to the embodiment.

As illustrated in FIG. 5, the clip 42 is comprised of a columnar shaft part 46 to be inserted into the upper through hole 16 and the lower through hole 36, a head portion 44 provided at one end of the shaft part 46, and a plurality of plate-like wing parts 48 provided on the circumferential surface of the shaft part 46. The head portion 44 is formed larger in diameter than the upper and lower through holes 16, 36, so that the head portion 44 is unable to pass through the upper and lower through holes 16, 36.

Figure 6:
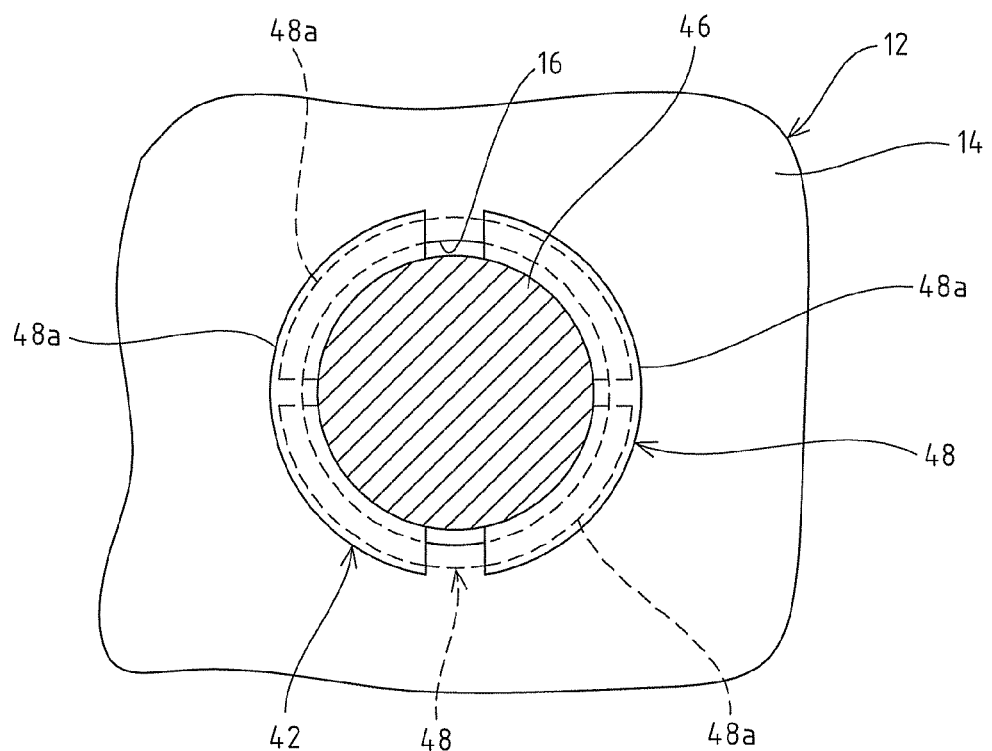
FIG. 6 is an enlarged cross-sectional view taken along the line 6-6 in FIG. 3.

The plurality of the wing parts 48 are provided to be aligned in the axial direction of the shaft part 46 and extend radially outward (outward crossing the axial direction) from the shaft part 46. Each wing part 48 includes a plurality of wing pieces 48a extending to be inclined toward the head portion 44 of the shaft part 46 as the wing pieces 48a separate away radially outward from the circumferential surface of the shaft part 46. The wing part 48 includes, as seen from FIG. 6, a pair of wing pieces 48a which are relatively formed with a clearance provided in the circumferential direction of the shaft part 46, and the wing pieces 48a are disposed symmetrically with the axial line of the shaft part 46 in between. Each wing piece 48a is formed so that its outer periphery extends in an arc-like fashion, and the size of the wing piece 48a extending from the shaft part 46 is constant in the circumferential direction of the shaft part 46.

The clip 42 is formed so that the diameter (outer size) of the shaft part 46 is insertable in the upper and lower through holes 16, 36, and each wing piece 48a is larger in outer size than the through holes 16, 36. Further, the wing pieces 48a have a flexibility so that they are elastically deformable radially inward to come closer to the shaft part 46, and the insertion of the wing pieces 48a into the through holes 16, 36 is permitted by the deformation thereof.

The clip 42 is attached such that the axial directional movement of the shaft part 46 is prevented by the restoration of the shape of each wing piece 48a after having passed through the upper through hole 16 or the lower through hole 36 so that the wing piece 48a is, for example, hooked at the edge of the opening of the upper through hole 16 or the lower through hole 36, or abuts on the inner wall of the upper through hole 16 or the lower through hole 36 to cause engagement.

The size of each clip 42 is set so that the distal-end side wing part 48 at least positions at opposite side to the lower through hole 36 of the upper through hole 16 when the clip 42 is inserted into the upper and lower through holes 16, 36 from the lower through hole 36. In addition, the clip 42 is set so that when the head portion 44 abuts on the lower coupling part 34, one of the plurality of wing parts 48 is hooked at the edge of the opening of the lower through hole 36 and another wing part 48 is hooked at the edge of the opening of the upper through hole 16. Further, the clip 42 is set so that when the head portion 44 abuts on the lower coupling part 34, the wing parts 48 are fitted in the upper through hole 16 and the lower through hole 36, respectively.

Next, the spoiler 10 according to the embodiment above will be described in terms of its assembling and configuration.

With the joint parts 40 of the lower member 32 placed over the back side of the upper member 12, the upper member 12 and the lower member 32 are assembled and set on a jig. At this time, the upper coupling parts 14 of the upper member 12 and the lower coupling parts 34 of the lower member 32 extend in the right-left direction which is the vibration direction at the time of vibration welding, and they are placed each other with the space S (see FIG. 3) therebetween in the front-rear direction so as to cross the vibration direction at the time of vibration welding. Then, the vibration welding is performed so that the upper member 12 and the lower member 32 are relatively vibrated in the right-left direction at a predetermined amplitude. As a result, the welding projections 40a of the lower member 32 are melted by frictional heat, and then the upper member 12 and the joint parts 40 of the lower member 32 are joined by cooling the melted portions.

Figure 4A:
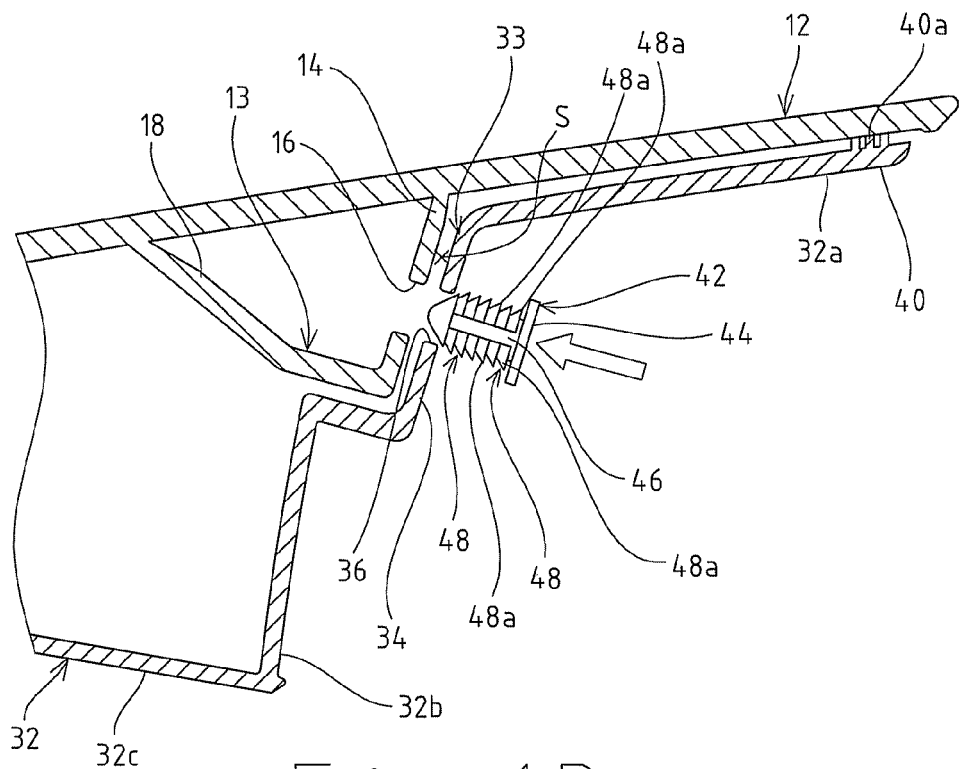
FIGS. 4A and 4B are explanatory diagrams illustrating attachment of a clip to an upper coupling part and a lower coupling part, FIG. 4A showing the clip set for the through holes, and FIG. 4B showing the clip attached.

As illustrated in FIG. 4A, even after the upper member 12 and the lower member 32 are assembled and joined by vibration welding, the upper coupling parts 14 and the lower coupling parts 34 are separated in the front-rear direction from each other to hold the space S. When the upper member 12 and the lower member 32 of the spoiler 10 are assembled, the space S is provided between the upper coupling parts 14 of the upper member 12 and the lower coupling parts 34 of the lower member 32, and each of the upper coupling parts 14 and the lower coupling parts 34 extends in the vibration direction at the time of vibration welding. In other words, the spoiler 10 is configured so that the space S is provided between the upper coupling parts 14 and the lower coupling parts 34. As a result, even when a variation in size of the upper member 12 or the lower member 32 occurs, and also when a variation at the time of assembling the upper member 12 and the lower member 32 or the like occurs, the variation at the time of vibration welding (at the time of joining) is absorbed by the space S, making it possible to avoid contact of the upper coupling part 14 with the lower coupling part 34. Because the upper coupling parts 14 and the lower coupling parts 34 of the spoiler 10 are relatively moved in parallel at the time of vibration welding, it is possible to avoid such an interference as collision of the upper coupling parts 14 with the lower coupling parts 34 or as a sliding contact therebetween, and thus smooth vibration welding is achieved. Therefore, it is possible to prevent a bad influence on the design surface of the spoiler 10 which may be originated from joining the upper coupling parts 14 and the lower coupling parts 34 by vibration welding with the upper and lower coupling parts 14, 34 being in contact state, or from vibration welding made during the upper coupling parts 14 and the lower coupling parts 34 in an interference state with each other.

Figure 4B:
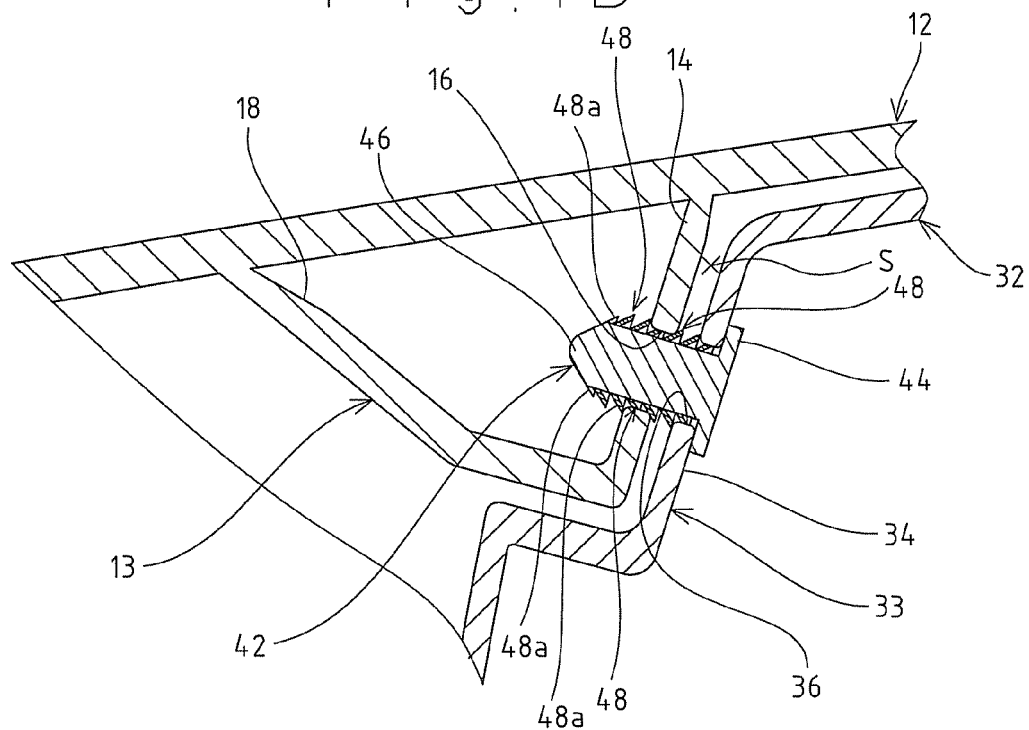

Next, as seen from FIG. 4A, each clip 42 is inserted into each one of the front-rear overlapping lower through holes 36 of the lower member 32 and the upper through holes 16 of the upper member 12, which have been joined by vibration welding, from the lower through hole side. As illustrated in FIG. 4B, because the wing piece 48a of the clip 42 is guided along its own slope to elastically deform at the time the clip is inserted into the upper and lower through holes 16, 36, the clip can be inserted into the individual through holes 16, 36 smoothly.

Then, as seen from FIG. 4B, at least one of the wing parts 48 of the clip 42 is hooked at the edge of the opening of at least one of the upper through hole 16 and the lower through hole 36 from the opposite side to the head portion 44 (on the distal-end side of the clip 42). In other words, the wing part 48 abuts on the edge of the opening of that surface of the coupling part 14, 34 on the opposite side to the surface on the head portion 44 side (surface positioned on the distal-end side of the clip 42). This prevents the pull-out of the clip 42 from the through hole 16, 36, so that the clip 42 is stably attached. In the embodiment, the wing part 48 (the second wing part from the head portion 44) of the clip 42 is hooked at the lower coupling part 34 of the lower member 32 which is the insertion side from the opposite side to the head portion 44, and another wing part 48 (the fifth wing part from the head portion 44) is hooked at the upper coupling part 14 of the upper member 12 which is opposite to the insertion side from the opposite side to the head portion 44. Further, the movement of the clip 42 in the insertion direction (the direction of white arrow in FIG. 4A) is prevented by the head portion 44 of the clip 42 since the head portion is unable to pass through the lower through hole 36 of the lower member 32.

As illustrated in FIG. 4B, the head portion 44 of the clip 42 abuts on the lower coupling part 34 which is the insertion side. Further, one of the wing parts 48 is fitted in the inner wall of at least one of the upper through hole 16 of the upper member 12 and the lower through hole 36 of the lower member 32. Accordingly, the inner walls of the upper and lower through holes 16, 36 abut against and interfere with the wing parts 48, suppressing the vibration or the movement of the clip 42 in a direction crossing the axial direction of the clip 42. In FIG. 4B, one of the wing parts 48 (the fourth wing part from the head portion 44) is fitted in the inner wall of the upper through hole 16 of the upper member 12, and another wing part 48 (the first wing part from the head portion 44) is fitted in the inner wall of the lower through hole 36 of the lower member 32. Even if force acting in the direction opposite to the insertion direction of the clip 42 (direction opposite from white arrow in FIG. 4A) is applied to the clip 42, the wing pieces 48a which are inclined to be open toward the head portion 44 are hooked at the coupling part 14, 34, making it difficult for the clip 42 to elastically deform radially inward. This makes pull-out of the clip 42 from the through holes 16, 36 difficult. The clips 42 attached to the upper and lower coupling parts 14, 34 in the spoiler 10 serve as a lock which prevents the movements of the upper member 12 and the lower member 32 in the up-down direction in which the back side of the upper member 12 and the joint parts 40 of the lower member 32 are separated from each other. Accordingly, the clips 42 can ensure a firm coupling of the upper member 12 to the lower member 32 in addition to the joint by vibration welding.

Each wing piece 48a of the clip 42 is inclined so that at the time the clip 42 is inserted into the through holes 16, 36, the wing piece 48a is easily elastically deformed inward in the radial direction. Therefore, at the time the clip 42 is inserted into the upper and lower through holes 16, 36, a large force to make the lower coupling part 34 of the lower member 32 approach the upper coupling part 14 of the upper member 12 is not applied. Further, the clip 42 is configured such that hooking of one of the wing parts 48 at the edge of the opening of the through hole 16, 36 causes the clip 42 to be attached to the upper and lower coupling parts 14 and 34; accordingly, a large force to make upper and lower coupling parts 14, 34 approach each other is not applied thereto.

As seen from the above, unlike fastening made by a screw or a bolt, the clip 42 does not fasten the upper coupling part 14 of the upper member 12 and the lower coupling part 34 of the lower member 32 together to make the upper and lower coupling parts approach each other. In other words, as illustrated in FIG. 4B, the spoiler 10 can keep the space S between the coupling parts 14, 34 of the upper and lower members 12, 34 when the clip 42 is attached to both coupling parts 14, 34. Because the upper and lower coupling parts 14, 34 of the spoiler 10 are joined by the clips 42 which do not apply fastening force thereto, the upper coupling part 14 or the lower coupling part 34 is not pulled by the clip 42. Therefore, it is possible to avoid deformation of the design surface derived from the pulling by the clip 42 on the upper coupling part 14 and the lower coupling part 34, making it possible to enhance the appearance of the design surface.

Since the spoiler 10, as described above, uses the clips 42 that do not apply fastening force on the coupling parts 14, 34 of the upper and lower members 12, 34, the space S between the upper and lower coupling parts 14, 34 does not cause such deterioration of the appearance of the design surface of the spoiler as increased deformation of the design surface derived from the space S. In other words, the use of the clips 42 allows the space S to intervene between the coupling parts 14, 34 of the upper and lower members 12, 34 of the spoiler 10, and this brings about the aforementioned operational advantages derived from the space S.

The above-described configuration of the embodiment is not restrictive and can be modified as follows.

(1) Although the upper member and the joint parts of the lower member are joined by vibration welding in the embodiment above, they can be joined by adhesives, double-sided adhesive tapes or other bonding means.

(2) Although the lower member as the second member constitutes a part of the design surface of the spoiler in the above embodiment, the design surface of the spoiler can be formed only by the upper member. Further, the upper member and the lower member can be provided with another member such as a lamp or a decorative member.

(3) The description of the embodiment above has been given for the example in which the upper member and the lower member are vibrated at the time of vibration welding in the right-left direction which is the long lengthwise direction of the spoiler. However, the vibration direction is not particularly limited as long as it is a linear direction along the back side of the upper member.

(4) In the description of the embodiment above, through holes of both upper and lower members pass through in the front-rear direction. Nonetheless, such through holes can be formed so as to pass through in a direction crossing the overlapping direction of the back side of the upper member and the joint parts of the lower member. In addition, the upper and lower coupling parts of the upper and lower members can be formed so as to respectively project from the upper member and the lower member so that the upper through hole and the lower through hole pass through in a direction crossing the overlapping direction.

(5) The description of the embodiment above has been given for the example that the upper coupling part and the lower coupling part extend in parallel to the vibration direction in vibration welding. However, the coupling parts can be set opposite to each other with a clearance larger than the amplitude of the vibration welding therebetween and vibrated so that the coupling parts come closer to and away from each other.

(6) Although the clip having a columnar shaft part is used in the embodiment above, the shaft part may have a square columnar shape. Although the description of the above embodiment has been given for the example that the single wing part comprises a pair of wing pieces aligned in the circumferential direction of the shaft part of the clip, the single wing part can be comprised of one wing piece or three or more wing pieces aligned in the circumferential direction of the shaft part of the clip. In addition, the outer peripheral edge of the wing piece may have a linear shape.

(7) Although in the embodiment above the head portion of the clip abut against the coupling part of the lower member, a clearance can be provided between the head portion and the coupling part.

(8) Although the embodiment above describes the clip that is inserted from the lower member side, the clip can be inserted from the upper member side.

Figure 7A:
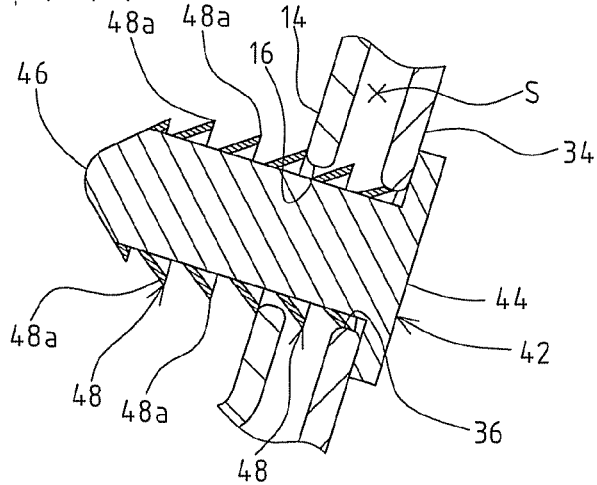
FIGS. 7A through 7C are explanatory diagrams illustrating modifications of the relation between the upper and lower coupling parts and the clip attached to the upper and lower coupling parts.
Figure 7B:
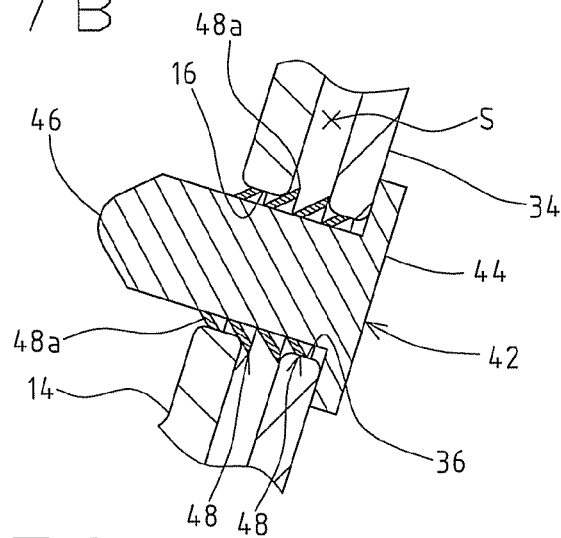

(9) According to the clip 42 of a modification illustrated in FIG. 7A, when the head portion 44 of the clip 42 abuts against the lower coupling part 34 of the lower member 32, one wing part 48 (the third wing part from the head portion 44) of the clip 42 is hooked at the edge of the opening of the upper through hole 16 of the upper coupling part 14 of the upper member 12 from the side opposite to the head portion 44, but no wing part 48 is hooked at the edge of the opening of the lower through hole 36 of the lower coupling part 34 of the lower member 32. Further, according to the clip 42 of another modification illustrated in FIG. 7B, when the head portion 44 of the clip 42 abuts against the lower coupling part 34, one wing part 48 (the second wing part from the head portion 44) is hooked at the edge of the opening of the lower through hole 36 of the lower coupling part 34 from the side opposite to the head portion 44, but no wing part 48 is hooked at the edge of the opening of the upper through hole 16 of the upper coupling part 14 of the upper member 12. In this way, by way of configuring the clip 42 so that one wing part 48 is hooked at either one of the upper and lower coupling parts 14 and 34, the head portion 44 and the wing part 48 can prevent the axial directional movement of the clip 42. In other words, although the embodiment above, as best seen from FIG. 4B, is described by way of an example that the wing parts of the clip are hooked at coupling parts of the upper and lower members 12 and 32, it is possible, as seen from FIGS. 7A and 7B, to adopt a configuration that one wing part of the clip 42 is hooked at one of the upper coupling part and the lower coupling part.

Figure 7C:
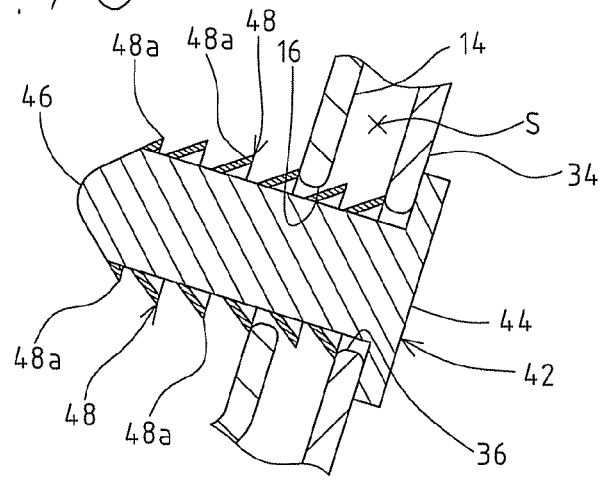

(10) As illustrated in FIG. 7A, the clip 42 is configured so that the wing part 48 (the first wing part from the head portion 44) is fitted inside of the inner wall of the lower through hole 36, and no wing part 48 is fitted inside of the inner wall of the upper through hole 16. In other words, although in the embodiment, the wing parts of the clip are fitted inside of the inner walls of the upper through hole and the lower through hole, the clip can be configured so that only one wing part is fitted inside of the inner wall of one of the upper through hole and the lower through hole. In addition, as illustrated in FIG. 7C, the clip 42 can be configured so that no wing part 48 is fitted inside of the inner wall of the upper through hole 16 nor inside of the inner wall of the lower through hole 36.

In the above embodiment, although the upper member is treated as the first member and the lower member is treated as the second member, the above relationship can be reserved. Namely, the lower member may be treated as the first member and the upper member may be treated as the second member. In such a case, the lower coupling part becomes to be the first coupling part and the upper coupling part becomes to be the second coupling part. Similarly, the lower through hole becomes to be the first through hole and the upper through hole becomes to be the second through hole.

What is claimed is:
1. A spoiler comprising:
a first member forming a design surface;
a second member joined to the first member by welding or bonding a joint part thereof placed over a back side of the first member;

a first coupling part formed to protrude on the back side of the first member, and having a first through hole passing therethrough in a direction crossing an overlapping direction in which the back side of the first member and the joint part of the second member are overlapped each other;

a second coupling part formed on the second member so as to face the first coupling part with a space therebetween when the back side of the first member is joined to the joint part of the second member, said second coupling part having a second through hole overlapping the first through hole; and a clip to be inserted into the first through hole and the second through hole so as to be attached to the first coupling part and the second coupling part, the clip having
- a shaft part to be inserted into the first through hole and the second through hole,
- a head portion provided at one end of the shaft part and unable to pass through the first and second through holes, and
- a plurality of wing parts formed on the shaft part so as to be aligned in an axial direction hereof and extend outward in a direction crossing the axial direction,
- one of the plurality of wing parts of the clip being hooked at an edge of an opening of at least one of the first and second through holes from an opposite side to the head portion, so that the clip is attached to the first coupling part and the second coupling part with the space therebetween.

2. The spoiler according to claim 1, wherein the first coupling part and the second coupling part are set so as to provide the space therebetween when the first member and the second member are assembled.

3. The spoiler according to claim 1, wherein the head portion of the clip abuts on one of the first and second coupling parts, and one of the plurality of wing parts of the clip is hooked at an edge of an opening of the through hole of another one of the first and second coupling parts from the opposite side to the head portion.

4. The spoiler according to claim 2, wherein the head portion of the clip abuts on one of the first and second coupling parts, and one of the plurality of wing parts of the clip is hooked at an edge of an opening of the through hole of another one of the coupling parts from the opposite side to the head portion.

5. The spoiler according to claim 1, wherein one of the plurality of wing parts of the clip is fitted in at least one of the first and second through holes.

6. The spoiler according to claim 2, wherein one of the plurality of wing parts of the clip is fitted in at least one of the first and second through holes.

7. The spoiler according to claim 3, wherein one of the plurality of wing parts of the clip is fitted in at least one of the first and second through holes.

8. The spoiler according to claim 4, wherein one of the plurality of wing parts of the clip is fitted in at least one of the first and second through holes.

9. The spoiler according to claim 1, wherein
the first member and the joint part of the second member are joined by vibration welding which causes linear vibration along the back side of the first member, and
the first coupling part and the second coupling part are formed so as to extend in a vibration direction at a time of the vibration welding.

10. The spoiler according to claim 2, wherein
the first member and the joint part of the second member are joined by vibration welding which causes linear vibration along the back side of the first member, and
the first coupling part and the second coupling part are formed so as to extend in a vibration direction at a time of the vibration welding.

11. The spoiler according to claim 3, wherein
the first member and the joint part of the second member are joined by vibration welding which causes linear vibration along the back side of the first member, and
the first coupling part and the second coupling part are formed so as to extend in a vibration direction at a time of the vibration welding.

12. The spoiler according to claim 4, wherein
the first member and the joint part of the second member are joined by vibration welding which causes linear vibration along the back side of the first member, and
the first coupling part and the second coupling part are formed so as to extend in a vibration direction at a time of the vibration welding.

13. The spoiler according to claim 5, wherein
the first member and the joint part of the second member are joined by vibration welding which causes linear vibration along the back side of the first member, and
the first coupling part and the second coupling part are formed so as to extend in a vibration direction at a time of the vibration welding.

14. The spoiler according to claim 6, wherein
the first member and the joint part of the second member are joined by vibration welding which causes linear vibration along the back side of the first member, and
the first coupling part and the second coupling part are formed so as to extend in a vibration direction at a time of the vibration welding.

15. The spoiler according to claim 7, wherein
the first member and the joint part of the second member are joined by vibration welding which causes linear vibration along the back side of the first member, and
the first coupling part and the second coupling part are formed so as to extend in a vibration direction at a time of the vibration welding.

16. The spoiler according to claim 8, wherein
the first member and the joint part of the second member are joined by vibration welding which causes linear vibration along the back side of the first member, and
the first coupling part and the second coupling part are formed so as to extend in a vibration direction at a time of the vibration welding.

* * * * *